(12) United States Patent
Kaysen

(10) Patent No.: US 6,839,776 B2
(45) Date of Patent: Jan. 4, 2005

(54) AUTHENTICATING PERIPHERALS BASED ON A PREDETERMINED CODE

(75) Inventor: David A. Kaysen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 09/137,285

(22) Filed: Aug. 20, 1998

(65) Prior Publication Data

US 2002/0007425 A1 Jan. 17, 2002

(51) Int. Cl.$^7$ .................................................. G06F 3/00
(52) U.S. Cl. ............................... 710/36; 710/1; 710/8; 710/10
(58) Field of Search ........................... 710/1, 63, 5, 14, 710/8, 10, 16, 36; 713/300

(56) References Cited

U.S. PATENT DOCUMENTS

| | | | |
|---|---|---|---|
| 4,371,950 A | * | 2/1983 | Chadra ........................ 358/1.15 |
| 4,613,954 A | * | 9/1986 | Sheth ........................... 710/57 |
| 5,038,320 A | * | 8/1991 | Heath et al. .................. 710/10 |
| 5,202,997 A | * | 4/1993 | Arato ........................... 713/200 |
| 5,214,771 A | * | 5/1993 | Clara et al. ................... 710/10 |
| 5,696,695 A | * | 12/1997 | Ehlers et al. ................. 364/492 |
| 5,862,452 A | * | 1/1999 | Cudak et al. ................. 455/6.3 |
| 5,867,501 A | * | 2/1999 | Horst et al. .................. 370/474 |
| 5,870,626 A | * | 2/1999 | Lebeau ......................... 710/11 |
| 5,887,131 A | * | 3/1999 | Angelo ..................... 395/188.01 |
| 5,905,249 A | * | 5/1999 | Reddersen et al. ..... 235/462.15 |
| 5,909,596 A | * | 6/1999 | Mizuta ........................ 710/63 |
| 5,923,897 A | * | 7/1999 | Lipe et al. ..................... 710/5 |
| 5,974,476 A | * | 10/1999 | Lin et al. ...................... 710/14 |
| 6,023,585 A | * | 2/2000 | Perlman et al. ............. 395/712 |
| 6,026,454 A | * | 2/2000 | Hauck et al. ................. 710/65 |
| 6,032,257 A | * | 2/2000 | Olarig et al. ............... 713/200 |
| 6,058,106 A | * | 5/2000 | Cudak et al. ............... 370/313 |

FOREIGN PATENT DOCUMENTS

| | | | | |
|---|---|---|---|---|
| JP | 401106153 A | * | 4/1989 | ..................... 13/14 |

* cited by examiner

Primary Examiner—Frantz B. Jean
(74) Attorney, Agent, or Firm—Trop, Pruner & Hu, P.C.

(57) ABSTRACT

A system may control whether a particular peripheral may be connected to a particular computer system. Based on the needs of a particular computer system, codes may be provided, for example by the computer system manufacturer to authorized vendors of peripherals. If those peripherals meet certain standards and specifications, they may be provided with a code which is then sent from the peripheral to the computer system when the peripheral is connected to the computer system. The computer system undertakes a check of the code to determine whether the peripheral is an authorized peripheral. If so, communications are allowed. Otherwise, the peripheral may be prevented from communicating with the rest of the computer system and the user may be notified that the peripheral is inappropriate for use with a given computer system.

20 Claims, 3 Drawing Sheets

AUTHENTICATING PERIPHERALS BASED ON A PREDETERMINED CODE

BACKGROUND

This invention relates generally to computer systems and to the connection of peripheral devices to computer systems.

Computer systems use a processor and memory to control the operation of a number of peripheral devices which may be connected to the computer system through buses. In accordance with established protocols, the processor communicates with the peripheral devices connected to the buses and controls their operation. Interrupts may be generated by these devices which cause the processor to attend to requests from the peripheral devices.

In some systems, peripheral devices must meet certain requirements to operate correctly. For example, in enhanced computer systems, it may be important that peripherals have adequate power and cooling in order to operate correctly with the computer system. If the peripherals do not have adequate capabilities, they can adversely affect the operation of the entire computer system. Therefore, it is desirable to have a way to control whether a particular peripheral device can be connected to a particular computer system.

SUMMARY

In accordance with one embodiment, a link for connecting a computer system, including a processor, with a peripheral has a first connector that connects to the system. A second connector connects to the peripheral. A first device checks a code received through the first connector from the second connector. A second device provides a code to the first device through the first and second connectors. The first device controls communication between the computer system and the peripheral based on the code.

DETAILED DESCRIPTION

Many computer systems have capabilities with strict requirements for peripherals that are connected to those computer systems. Certain enhanced computer systems, for example operating at particularly high speeds, need peripherals which are adapted to operate with such computer systems. This may mean that the peripherals must have certain power and cooling capabilities in order to operate under the conditions encountered with a given computer system.

In accordance with one embodiment, a technique is provided for controlling whether a particular computer system should accept a given peripheral connected to that computer system. The determination of whether to accept the peripheral may occur at any point in the operation of the computer system. However, the determination may advantageously be made during the power on self test (POST). For example, during the POST an inquiry may be made to find out what peripherals are connected to the system and those peripherals may be interrogated in accordance with the principles described hereinafter. If the peripheral is not suitable for use with the computer system, communication with the system may be prevented, effectively disabling the peripheral.

Figure 1:
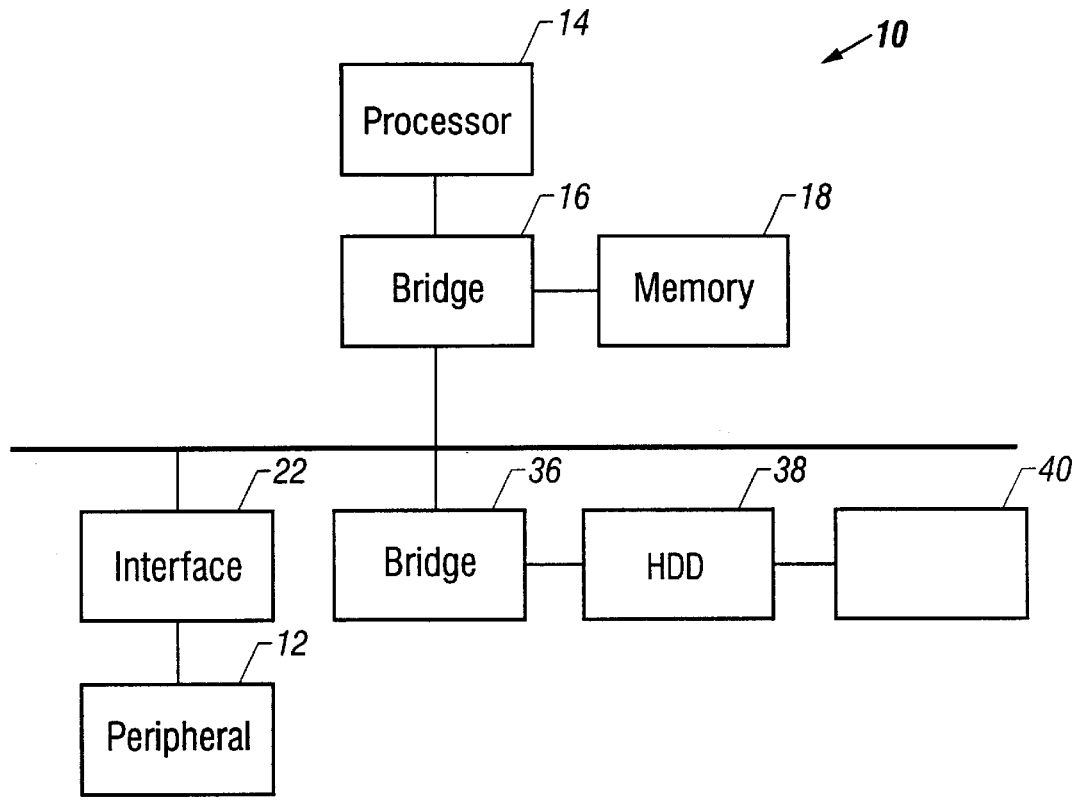
FIG. 1 is a block diagram depiction of a computer system connected to a peripheral in accordance with one embodiment of the present invention.

Referring to FIG. 1, an exemplary computer system 10 includes a processor 14, a bridge 16 and a system memory 18 arranged in a conventional fashion. The bridge 16 is coupled to a bus 20, another bridge 36, and an interface 22. The interface 22 interfaces the computer system 10 with a peripheral 12. The peripheral 12 may be any one of a number of peripheral devices commonly connected to computer systems. For example, the peripheral 12 could be a hard disk drive, a modem, a compact disk read only memory (CD-ROM), a network interface card or any of a variety of other peripherals. The bridge 36 may be connected to a hard disk drive 38 which may store a software routine 40 which is responsible for implementing the authentication protocol with a new peripheral.

Figure 2:
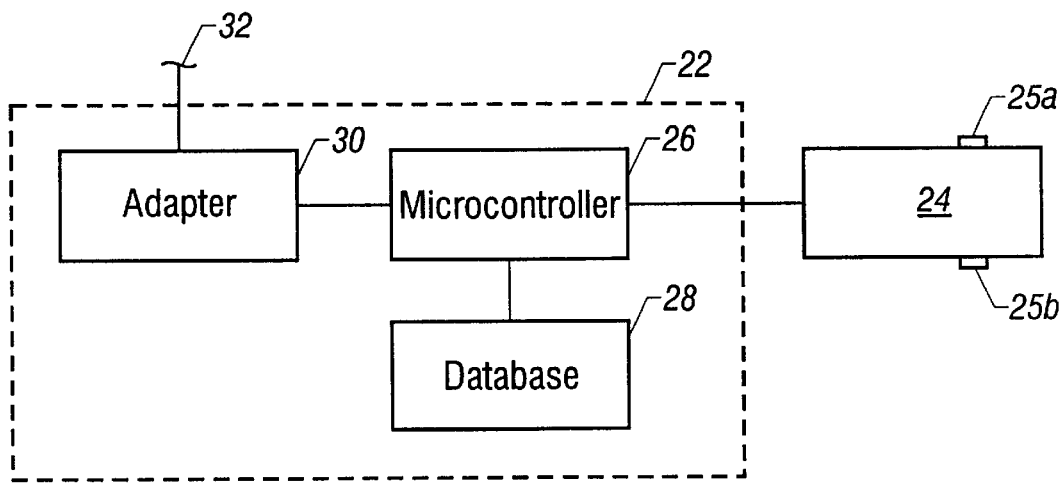
FIG. 2 is a block diagram of the interface shown in FIG. 1.

Referring next to FIG. 2, the interface 22 may include an adapter 30 which is conventionally used to interface a peripheral with a computer system. The nature of the adapter 30 is dependent upon the characteristics of the particular peripheral.

The adapter 30 may be coupled to a microcontroller 26 which determines whether to accept a particular peripheral. While this interrogation technique is illustrated as being implemented by a separate microcontroller, it can also be done through the processor 14 or any other component. However, it may be advantageous to use a microcontroller which handles this routine and severs communication with a peripheral, if appropriate, without allowing the peripheral to interact with the rest of the computer system 10.

The microcontroller 26 includes a database 28 which stores codes for acceptable peripherals. These codes may be provided to manufacturers of peripheral devices who manufacture peripheral devices which meet certain requirements necessary for the operation of the computer system. These requirements could be adequate power supply, cooling or other requirements necessary to operate compatibly with a given computer system. The microcontroller 26 may receive a serial data stream from a connector 24 which connects to the peripheral 12.

Figure 3:
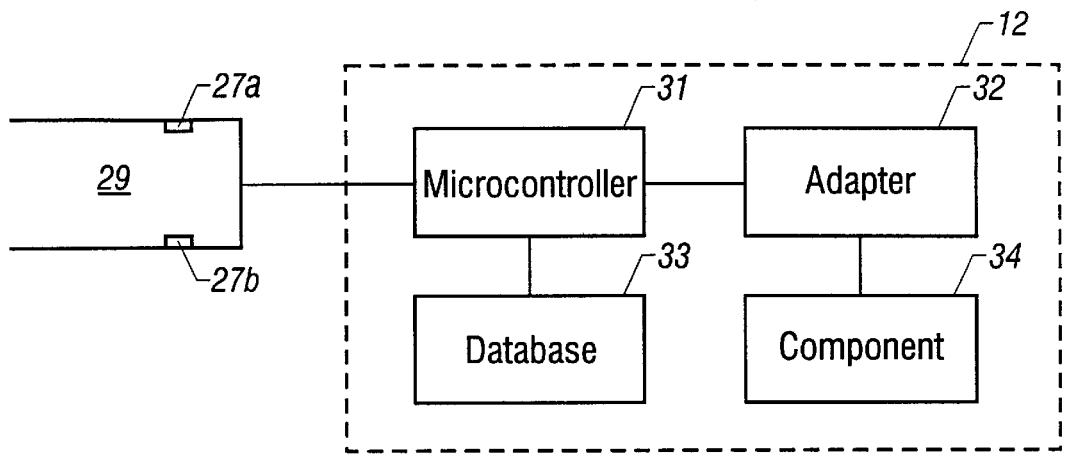
FIG. 3 is a block diagram of the peripheral shown in FIG. 1.

Turning now to FIG. 3, the peripheral 12 includes a mating connector 29 which mates with the connector 24. Like the interface 22, the peripheral 12 may include a microcontroller 31 connected to a database 33. The microcontroller 28 also couples an adapter 32 which may be conventional in all respects, corresponding to a conventional adapter provided in a particular peripheral component 34 device for communicating with a computer system. The adapter 32 also connects to the particular peripheral involved, be it a network interface card, CD-ROM drive or the like.

The microcontroller 31 provides an encoded stream of data using the database 33 which is provided to the microcontroller 26 to verify that the peripheral 12 is authorized to operate with a particular computer system. It may also provide useful information to the computer system in accommodating any special requirements of the peripheral. For example, it can include information about the type of signals provided by the peripheral, the speed of those signals, conventions utilized, and alternate modes of operation.

Figure 4:
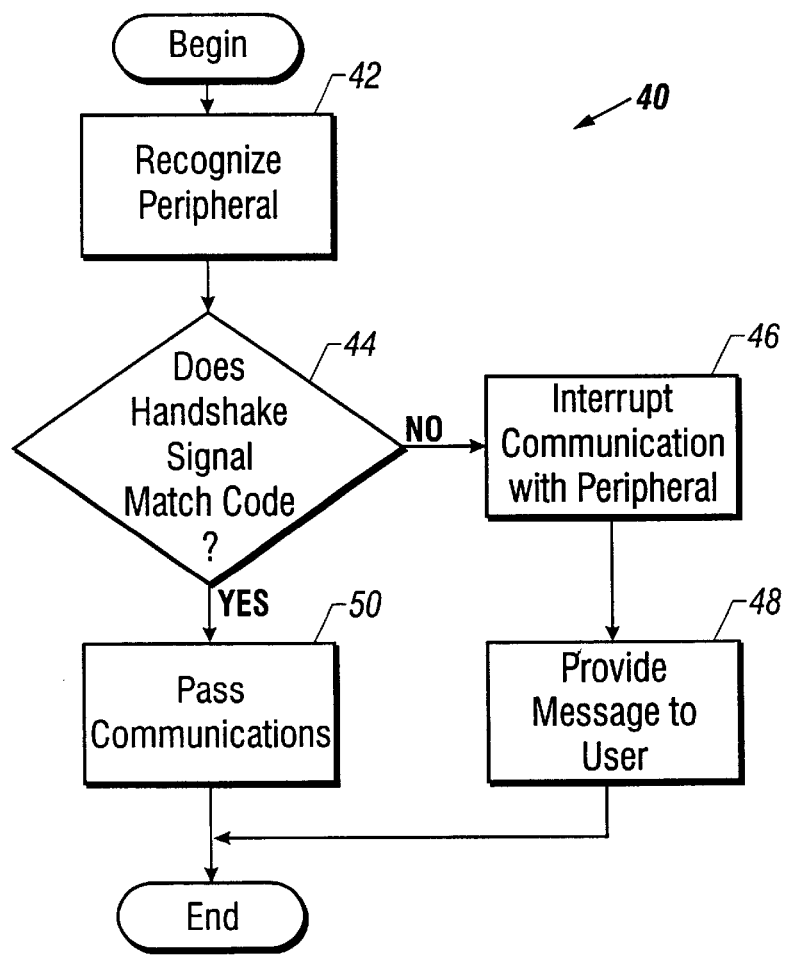
FIG. 4 is a flow for a software routine that may be used by the computer system to determine whether a particular peripheral may be connected to the computer system.

Referring now to FIG. 4, a software routine 40 may be stored on a hard disk drive 38 or provided with the microcontroller 26. The routine 40 initialing recognizes a stream of data from the peripheral, as indicated in block 42. At diamond 44 an inquiry determines whether the signal received from the peripheral 12 includes a code which matches a code in a database of codes contained, for example, in the database 28 of acceptable peripheral codes. If so, communications are permitted to proceed, as indicated in block 50.

Otherwise, communications with the peripheral are interrupted as indicated at 46. If desired, the user can be notified (block 48) by an appropriate message, for example through a message box on a display screen, indicating that the peripheral is not appropriate for use with the computer system.

If the routine is implemented in the Initialization sequence of the computer system, for example as part of the POST, a flag may be set for a particular peripheral which indicates that it is an acceptable peripheral. This avoids rechecking the database each time the computer system is turned on. Similarly if the operation is done entirely by the microcontroller 26, a device identifier or other code may be included within a file in the database 28. The file records acceptable component identifiers previously used with the system. This file may be checked first to avoid checking the entire database each time a new code is received from a peripheral.

In this way, a computer system may be protected from peripherals which are inappropriate for use with that computer system. Through the use of a coded system, the ability of users to circumvent the protective feature is relatively limited. Therefore, the computer system manufacturer and its owner can be assured that only appropriate peripherals are used with the computer system, avoiding the possibility of malfunctions or other adverse consequences.

Figure 5:
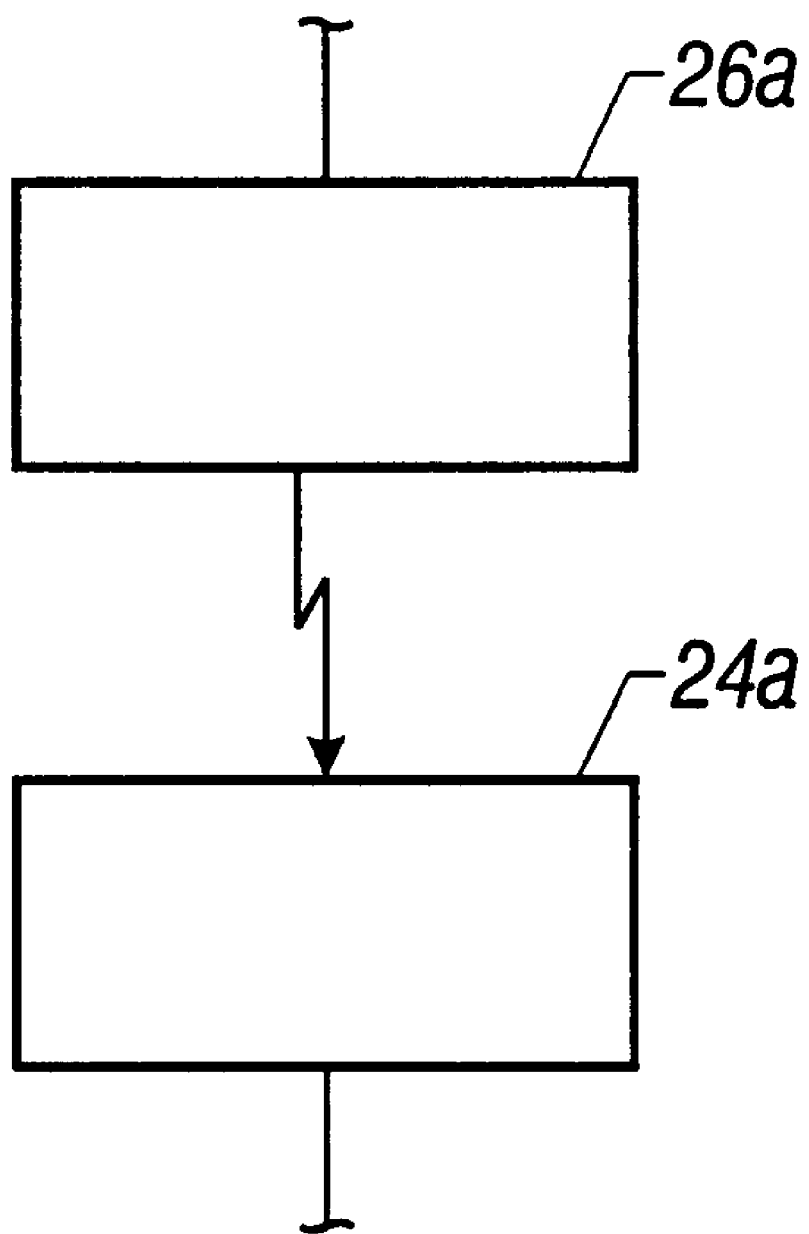
FIG. 5 is a block depiction of alternate connectors that may be used with the system shown in FIGS. 2 and 3.

The connectors 24 and 26 may be electromechanical connectors of any conventional design such as plugs, contacts or the like. The connectors 24a, 26a, shown in FIG. 5, may provide communication using an electromagnetic wave (as indicated), such as an infrared or radio wave connection used to connect peripherals with computer systems.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A link for connecting a computer system, including a processor, with a peripheral comprising:
   a first connector that couples to said system;
   a second connector that couples to said peripheral;
   a first device that checks a code received through said first connector from said second connector;
   a second device that provides a code to said first device through said first and second connector; and
   said first device controlling communication between said computer system and said peripheral based on said code.

2. The link of claim 1 wherein said first and second connectors implement an infrared connection.

3. The link of claim 1 wherein said first and second connectors implement a radio frequency connection.

4. The link of claim 1 wherein at least one of said first and second devices is a microcontroller including a database which contains information about said code.

5. The link of claim 1 wherein said first device includes software which enables a check to determine whether or not said code is one which identifies the peripheral as an acceptable peripheral for the computer system.

6. The link of claim 1 wherein if an appropriate code is not received by said first device, said first device is adapted to prevent communication with said peripheral.

7. The link of claim 6 including a circuit that provides a message to the user if communication with the peripheral is being prevented.

8. The link of claim 1 wherein said first device provides a serial data stream which identifies said peripheral and provides an authentication code.

9. A computer system comprising:
   a processor;
   a storage device associated with said processor;
   at least one bus to communicate with said processor, said bus adapted to connect to a peripheral; and
   said storage device storing software to determine whether a code received from said peripheral corresponds to a code identifying the peripheral as one that may be used with the computer system.

10. The system of claim 9 including an element that prevents communication with a peripheral which does not transmit an appropriate code.

11. The system of claim 10 wherein said element is a microcontroller.

12. A method comprising:
   causing a peripheral to provide a code to a computer system which identifies said peripheral;
   checking said code to determine whether said peripheral is one authorized for use with the computer system; and
   if said code is not an appropriate code, controlling communications between said peripheral and said computer system.

13. The method of claim 12 including notifying the user of the computer system that communications with the peripheral are being controlled.

14. The method of claim 12 wherein said controlling step includes preventing communications between said peripheral and said computer system.

15. An article comprising a medium for storing instructions that cause a computer to:
   cause a peripheral to provide a code to a computer system which identifies said peripheral;
   check said code to determine whether said peripheral is one authorized for use with the computer system; and
   if said code is not an appropriate code, control communications between said peripheral and said computer system.

16. The article of claim 15 including instructions that cause a computer to notify the user of the computer system that communications with the peripheral are being controlled.

17. The article of claim 15 including instructions that cause a computer to prevent communications between said peripheral and said computer system if said code is not an appropriate code.

18. A computer system comprising:

a processor; and an interface, couplable to a peripheral, to determine whether said peripheral should be allowed to communicate with said processor, said interface including a device to determine whether a code received by the interface from the peripheral corresponds to a code identifying the peripheral as one that may be utilized by said computer and to prevent communication by the peripheral via the interface with the computer system unless the peripheral provides an appropriate code.

19. The system of claim 18 wherein said interface includes a connector to connect to the peripheral.

20. The system of claim 18 wherein said interface includes a controller to detect the code from the peripheral device without involving the processor.

* * * * *